US012498416B2

(12) United States Patent
Saddow et al.

(10) Patent No.: US 12,498,416 B2
(45) Date of Patent: Dec. 16, 2025

(54) SYSTEMS AND METHODS FOR TESTING INTEGRATED CIRCUITS INDEPENDENT OF CHIP PACKAGE CONFIGURATION (71) Applicants: UNIVERSITY OF SOUTH FLORIDA, Tampa, FL (US); GLOBAL ETS, LLC, Odessa, FL (US)

(72) Inventors: Stephen Saddow, Tampa, FL (US); Cong Xu, Odessa, FL (US); Feng Yu, Odessa, FL (US); Liwei Xu, Odessa, FL (US); Yunghsiao Chung, Odessa, FL (US)

(73) Assignees: UNIVERSITY OF SOUTH FLORIDA, Tampa, FL (US); GLOBAL ETS, LLC, Odessa, FL (US)

( * ) Notice: Subject to any disclaimer, the term of this patent is extended or adjusted under 35 U.S.C. 154(b) by 0 days.

(21) Appl. No.: 18/859,430

(22) PCT Filed: Oct. 26, 2023

(86) PCT No.: PCT/US2023/077943
§ 371 (c)(1),
(2) Date: Oct. 23, 2024

(87) PCT Pub. No.: WO2024/092147
PCT Pub. Date: May 2, 2024

(65) Prior Publication Data
US 2025/0251445 A1 Aug. 7, 2025

Related U.S. Application Data (60) Provisional application No. 63/419,415, filed on Oct. 26, 2022.

(51) Int. Cl.
*G01R 31/28* (2006.01)
*G01R 31/317* (2006.01)

(52) U.S. Cl.
CPC .... *G01R 31/2896* (2013.01); *G01R 31/31713* (2013.01); *G01R 31/31719* (2013.01)

(58) Field of Classification Search
None
See application file for complete search history.

(56) References Cited

U.S. PATENT DOCUMENTS

2015/0066417 A1  3/2015  Kimura et al.
2017/0074932 A1  3/2017  Kourfali et al.
(Continued)

FOREIGN PATENT DOCUMENTS

CN   106771982 B   12/2019
CN   111273153 A   6/2020
(Continued)

OTHER PUBLICATIONS

Translation of WO 2020/075327 A1 (Year: 2020).*
(Continued)

*Primary Examiner* — Jermele M Hollington
(74) *Attorney, Agent, or Firm* — HUSCH BLACKWELL LLP (57) ABSTRACT Systems and methods of testing integrated circuits independent of chip package configuration include or utilize a socket configured to receive a device under test (DUT), wherein the socket includes a plurality of input pins and a plurality of output pins, and wherein the DUT includes a plurality of device pins; a wireless communication device configured to wirelessly transmit information on the DUT to a server device operating a machine learning (ML) model, and wirelessly receive response data generated by the ML model from the server device, the response data including at least one of a pin configuration information of the DUT or a timing configuration information of the DUT; and a switch array configured to route respective ones of the plurality of (Continued)

device pins to corresponding ones of the plurality of output pins based on the response data.

18 Claims, 10 Drawing Sheets

(56) References Cited

U.S. PATENT DOCUMENTS

| | | | |
|---|---|---|---|
| 2018/0300652 A1 | 10/2018 | Izumi et al. | |
| 2019/0356397 A1* | 11/2019 | DaSilva | G01R 1/045 |
| 2020/0033403 A1* | 1/2020 | Bush | G01R 31/287 |
| 2020/0403782 A1 | 12/2020 | Riou et al. | |

FOREIGN PATENT DOCUMENTS

| | | | |
|---|---|---|---|
| WO | WO-2020075327 A1 * | 4/2020 | G06N 7/01 |
| WO | 2021/080670 A1 | 4/2021 | |
| WO | 2021/211308 A1 | 10/2021 | |
| WO | 2024/092147 A1 | 5/2024 | |

OTHER PUBLICATIONS

International Search Report of related PCT/US2023/077943, mailed Feb. 12, 2024, 3 pages.

Written Opinion of related PCT/US2023/077943, mailed Feb. 12, 2024, 8 pages.

Reza, M. F. Machine learning for design and optimization challenges in multi/many-core network-on-chip. In Proceedings of the 14th International Workshop on Network on Chip Architectures, (Oct. 2021) (pp. 29-34).

* cited by examiner

SYSTEMS AND METHODS FOR TESTING INTEGRATED CIRCUITS INDEPENDENT OF CHIP PACKAGE CONFIGURATION

CROSS-REFERENCE TO RELATED APPLICATIONS

This is a national stage filing under 35 U.S.C. § 371 of International Application No. PCT/US2023/077943, filed on Oct. 26, 2023, which application claims the benefit of U.S. Provisional Patent Application Ser. No. 63/419,415, filed Oct. 26, 2022, the disclosures of which are hereby incorporated by reference in their entirety, including all figures, tables, and drawings.

TECHNICAL FIELD

This disclosure relates generally to authentication of electronic components.

BACKGROUND

Counterfeit electronics are both an extremely serious and common issue in the global systems supply chain which increases the risk of critical system errors and failure which can even be life-threatening. Systems affected range from modern mobile devices (cell phones, tablets, etc.), computers and laptops, medical diagnostic and treatment systems, air traffic control and GPS systems, etc. Critical systems have a long life cycle and often use obsolete "legacy" devices which makes them a target for counterfeit parts due to economic reasons. For example, reproducing legacy parts is both expensive and time consuming due to advances in the manufacturing chain that made these parts obsolete in the first place. In addition, using obsolete parts often leads to quality conformance issues even if the part is legitimate since some of the electronics might have been sitting on the shelf (e.g., for over 20 years).

Purchasing electronic parts directly from part manufacturers and their authorized suppliers is the lowest risk step in the procurement of parts for critical systems. However, for various reasons, such as obsolete parts, short lead times, etc., parts are often purchased from unauthorized sources or brokers. This alone may put an entire system that uses the replacement part at risk. Counterfeit integrated circuit (IC) chips and quality conformance of microelectronics are big challenges. Furthermore, being able to identify counterfeit parts in the supply chain is extremely challenging, time consuming, and expensive.

To ensure the reliability of each chip before it is installed in a product, stringent testing is required. However, due to the wide variety of chips on the production line and the fast update speed, it is difficult to build a dedicated test circuit for each electronic chip. Accordingly, there is a need in the art for an improved system and method that allows for rapid measurement of the properties and reliability of chips.

SUMMARY

The present invention provides a remotely controllable, automatic chip external pin configuration control system.

According to one aspect of the present disclosure, a universal circuit configuration system is provided. The system comprises a socket configured to receive a device under test (DUT), wherein the socket includes a plurality of input pins and a plurality of output pins, and wherein the DUT includes a plurality of device pins; a wireless communication device configured to wirelessly transmit information on the DUT to a server device operating a machine learning (ML) model, and wirelessly receive response data generated by the ML model from the server device, the response data including at least one of a pin configuration information of the DUT or a timing configuration information of the DUT; and a switch array configured to route respective ones of the plurality of device pins to corresponding ones of the plurality of output pins based on the response data.

According to another aspect of the present disclosure, a universal method of device testing is provided. The method comprises inserting a device under test (DUT) into a socket, wherein the socket includes a plurality of input pins and a plurality of output pins and wherein the DUT includes a plurality of device pins, such that respective ones of the plurality of device pins are operatively connected to corresponding ones of the plurality of input pins; communicating with a server device operating an ML model, including: wirelessly transmitting information on the DUT to the server device, and wirelessly receiving response data generated by the ML model from the server device, the response data including at least one of a pin configuration information of the DUT or a timing configuration information of the DUT; and routing respective ones of the plurality of device pins to corresponding ones of the plurality of output pins based on the response data.

According to another aspect of the present disclosure, a non-transitory computer-readable medium is provided. The non-transitory computer-readable medium stores instructions that when executed by a processor of a universal circuit configuration system having a device under test (DUT) inserted in a socket of the universal circuit configuration system, cause the universal circuit configuration system to: wirelessly transmit information on the DUT to a server device operating an ML model; wirelessly receive response data generated by the ML model from the server device, the response data including at least one of a pin configuration of the DUT or a timing configuration of the DUT; and route respective ones of a plurality of device pins of the DUT, that are in contact with corresponding ones of a plurality of input pins of the socket, to corresponding ones of a plurality of output pins of the socket based on the response data.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. Additionally, certain dimensions may be exaggerated to help visually convey certain principles. The drawings illustrate only exemplary embodiments and are therefore not to be considered limiting of the scope described herein, as other equally effective embodiments are within the scope of this disclosure.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments. As used herein, the "present disclosure" refers to any one of the embodiments described herein and any equivalents. Furthermore, reference to various feature(s) of the "present embodiment" is not to suggest that all embodiments must include the referenced feature(s).

Among embodiments, some aspects of the present disclosure are implemented by a computer program executed by one or more processors, as described and illustrated. As would be apparent to one having ordinary skill in the art, one or more embodiments may be implemented, at least in part, by computer-readable instructions in various forms, and the present disclosure is not intended to be limiting to a particular set or sequence of instructions executed by the processor.

The embodiments described herein are not limited in application to the details set forth in the following description or illustrated in the drawings. The disclosed subject matter is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein the terms "machine," "computer," and "server" are not limited to a device with a single processor, but may encompass multiple devices (e.g., computers) linked in a system, devices with multiple processors, special purpose devices, devices with various peripherals and input and output devices, software acting as a computer or server, and combinations of the above.

Counterfeit electronics is both an extremely serious and a very common issue in the global systems supply chain which increases the risk of critical system errors and failures which can even be life-threatening. Affected systems range from modern mobile devices (cell phones, tablets, etc.), computers & laptops, medical diagnostic & treatment systems, air traffic control & GPS systems, etc. Critical systems typically have a long life cycle (decades) and often use obsolete 'legacy' devices which makes them a target for counterfeit parts due to economic reasons. For example, reproducing legacy parts is both expensive and time consuming due to advances in the manufacturing chain that made these parts obsolete in the first place. In addition, using obsolete parts often leads to quality conformance issues, even if the part is legitimate, since some of the electronics might have been sitting on the shelf for over twenty years.

Purchasing electronic parts directly from part manufacturers and their authorized suppliers can be a low risk step in the procurement of parts for critical systems. However, for various reasons such as an obsolete part, short lead time, etc., parts may be purchased from unauthorized sources or brokers, which can put an entire system that uses the replacement part at risk. For existing systems, some manufacturers often create an ID code in the device memory or microcontroller to prevent counterfeit electronics from being inserted into critical systems. This ID code can be a serial binary code stored in an unerasable or unchangeable register of the device memory.

In various embodiments, the present invention identifies the package pin configuration from a chip datasheet and connects each pin of the chip to the corresponding resource separately, for example, matching the required power supply voltage for the Vcc pin, providing the corresponding clock frequency for the clock pin, and/or providing different power-on values for the on-chip resources in the chip timing and general-purpose input/output (GPIO) position and potential initialization between the host computer tester (such as the need for pull-up resistors or pull-down resistors). At the same time, the external electrical properties of multiple chips can be remotely configured in real-time for a multi-state target test system in an IoT system.

A universal external circuit configuration system is provided by the present invention. In various embodiments, the present invention provides a system and method that allows for rapid measurement of the properties and reliability of chips, within a short time frame, which also significantly reduces setup time for external circuits, thereby reducing potential risks caused by installing defective chips into electronic products. The applicable chip types include, but are not limited to, functional chips based on digital communication, field-programmable gate arrays (FPGAs), microcontroller units (MCUs), memory chips, central processing unit (CPU) chips, graphics processing unit (GPU) chips, and the like.

The systems and methods of the present disclosure provide for the automatic configuration of the electrical interface between integrated circuit chips, independent of the chip package type and pin count. This universal interface eliminates the need for connecting circuit pins to the test equipment by hand using jumper wires, and eliminates the need for changing the testing board when the chip under test changes. This significantly reduces setup time, eliminates human error, and allows for more rapid integrated circuit testing to increase testing throughput.

The various embodiments of the present disclosure incorporate a built-in chip pin configuration unit, which can directly obtain pin information by reading the chip datasheet and automatically configuring pin routing from the tester to the chip. The whole process can be directly connected to the socket of the chip without the assistance of an external additional board.

Thus, the present disclosure provides a system and method to enable IC testing independent of chip packaging configuration. The systems and methods herein provide several advantages over comparative testing systems and methods, including but not limited to reducing the complexity and cost of testing and improving the versatility and flexibility of testing. By eliminating the impact of chip packaging configuration on the test process, the present disclosure may facilitate a faster and more accurate test process, thereby accelerating IC design and manufacturing cycles. Furthermore, the present disclosure may provide support for a wider range of chip packaging types and provide more powerful and scalable test solutions, thus opening up new possibilities for the testing and verification of ICs.

The automatic chip configuration system of the present invention provides an electrical chip configuration system in which the chip does not require external circuits and can be operated directly through the machine's own resources. The automatic configuration system is not limited to the number of pins, packaging methods and chip types. It is a signal routing system that automatically configures signals such as pin potential, clock frequency, input, and output mode, Joint Test Action Group (JTAG) digital pin assignment, etc. according to the chip's own datasheet.

As used herein, "configuration" refers to the definition of the pin to which each signal belongs, and the automatic one-to-one setting of electrical parameters for each pin, such as voltage, current, clock input, mode selection and signal input and output, etc. The system of the present invention is a hardware connection method that is configured using software from the chip manufacturer's data sheet. The chip does not require any additional external circuit setup in the device.

As used herein, "universal" refers to a universal automatic pin configuration system that does not limit chip types, chip functions, and packaging modes. The chips to be tested are of different types and numbers of pins, but the system used in this patent can directly perform functional testing and perform scanning and timing testing of all GPIOs.

Figure 1:
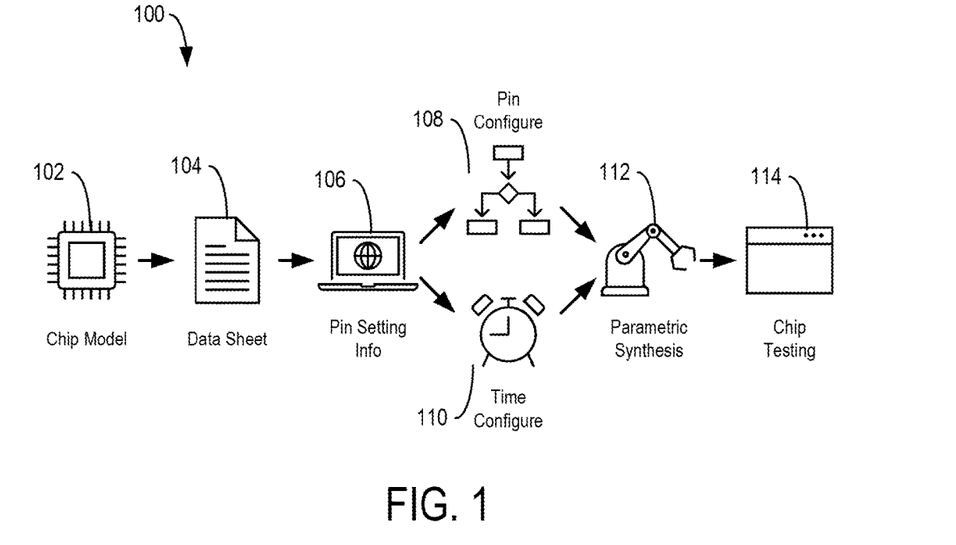
FIG. 1 illustrates an example of operation of a universal circuit configuration system in accordance with various aspects of the present disclosure.

Referring now to the drawings, FIG. 1 illustrates the operation of an example of a universal circuit configuration system 100. As shown in FIG. 1 the chip model 102, information from the data sheet 104, and pin setting information 106 are used to generate the pin configuration 108 and timing configuration 110 for the parametric synthesis 112 that is then used for chip testing 114. In one particular example, an operator of the system 100 may input the chip model 102, the data sheet 104, and/or the pin setting information 106. In other examples, the operator of the system 100 may only input one or two such parameter(s), and the system may be configured to determine the other parameter(s) based on the input parameter(s) (e.g., by querying a database associated with the system 100). In still other examples, the system 100 may be configured to automatically infer all parameters (e.g., based on an output signal from the chip. The system 100 may generate the pin configuration 108 and timing configuration 110 as a prediction; that is, the system 100 may predict that the chip has a particular pin configuration, power-up sequence, pin count, etc. based on the chip model 102 and/or the data sheet 104. The pin configuration 108 and timing configuration 110 may be determined by querying a database, by querying a machine learning (ML) model, by sending test signals to the chip or by combinations thereof.

Figure 2:
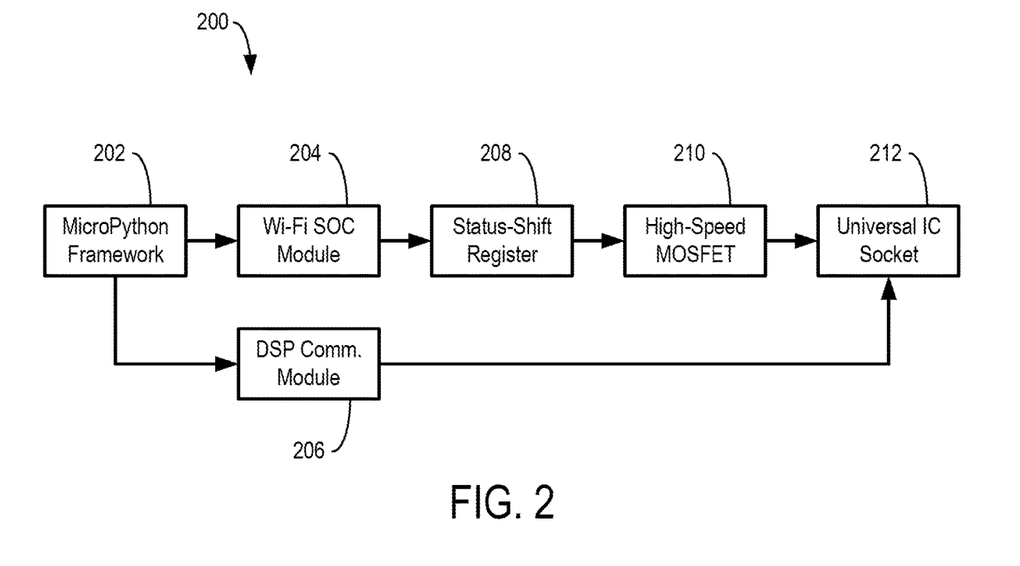
FIG. 2 illustrates an example of a control signal flowchart of a universal circuit configuration system in accordance with various aspects of the present disclosure.

As shown in FIG. 2, in a particular embodiment, the control signal flowchart 200 incorporates a MicroPython framework 202, a Wi-Fi system-on-chip (SOC) module 204, a digital signal processor (DSP) communication module 206, a status shift register 208, a high-speed metal-oxide-semiconductor field-effect transistor (MOSFET) 210, and a universal IC socket 212 to provide the universal interface for testing the chip. In one particular example: the SOC module 204 may be an ESP32-series microcontroller chip manufactured by Espressif Systems, and may include one or more of a processor, a memory, wireless communication circuitry (e.g., Wi-Fi and/or Bluetooth communication circuitry), peripheral interfaces, or firmware; the DSP communication module 206 may be an Arduino Uno microcontroller board, and may include one or more of a processor, a memory, input/output (I/O) interfaces, or firmware; the status shift register 208 may be an 74HC595 8-bit shift register manufactured by Texas Instruments; the MOSFET 210 may be an n-type enhancement-mode MOSFET such as a 2N7000 MOSFET; and the universal IC socket 212 may have a 40-pin dual in-line package (DIP40) layout. While FIG. 2 (and various other figures) illustrate examples in which MOSFETs are used, in practical implementations any circuit switch may be used, including other types of transistors.

As used herein, the term "processor" may include one or more individual electronic processors, each of which may include one or more processing cores, and/or one or more programmable hardware elements. The processor may be or include any type of electronic processing device, including but not limited to CPUs, GPUs, application specific integrated circuits (ASICs), FPGAs, microcontrollers, DSPs, or other devices capable of executing software instructions. When a device is referred to as "including a processor," one or all of the individual electronic processors may be external to the device (e.g., to implement cloud or distributed computing). In implementations where a device has multiple processors and/or multiple processing cores, individual operations may described herein be performed by any one or more of the microprocessors or processing cores, in series or parallel, in any combination.

As used herein, the term "memory" may be any storage medium, including a non-volatile medium, e.g., a magnetic media or hard disk, optical storage, or flash memory; a volatile medium, such as system memory, e.g., random access memory (RAM) such as dynamic RAM (DRAM), synchronous dynamic RAM (SDRAM), static RAM (SRAM), extended data out (EDO) DRAM, extreme data rate dynamic (XDR) RAM, double data rate (DDR) SDRAM, etc.; on-chip memory; and/or an installation medium where appropriate, such as software media, e.g., a CD-ROM, or floppy disks, on which programs may be stored and/or data communications may be buffered. The term "memory" may also include other types of memory or combinations thereof. For the avoidance of doubt, cloud storage is contemplated in the definition of memory.

Figure 3:
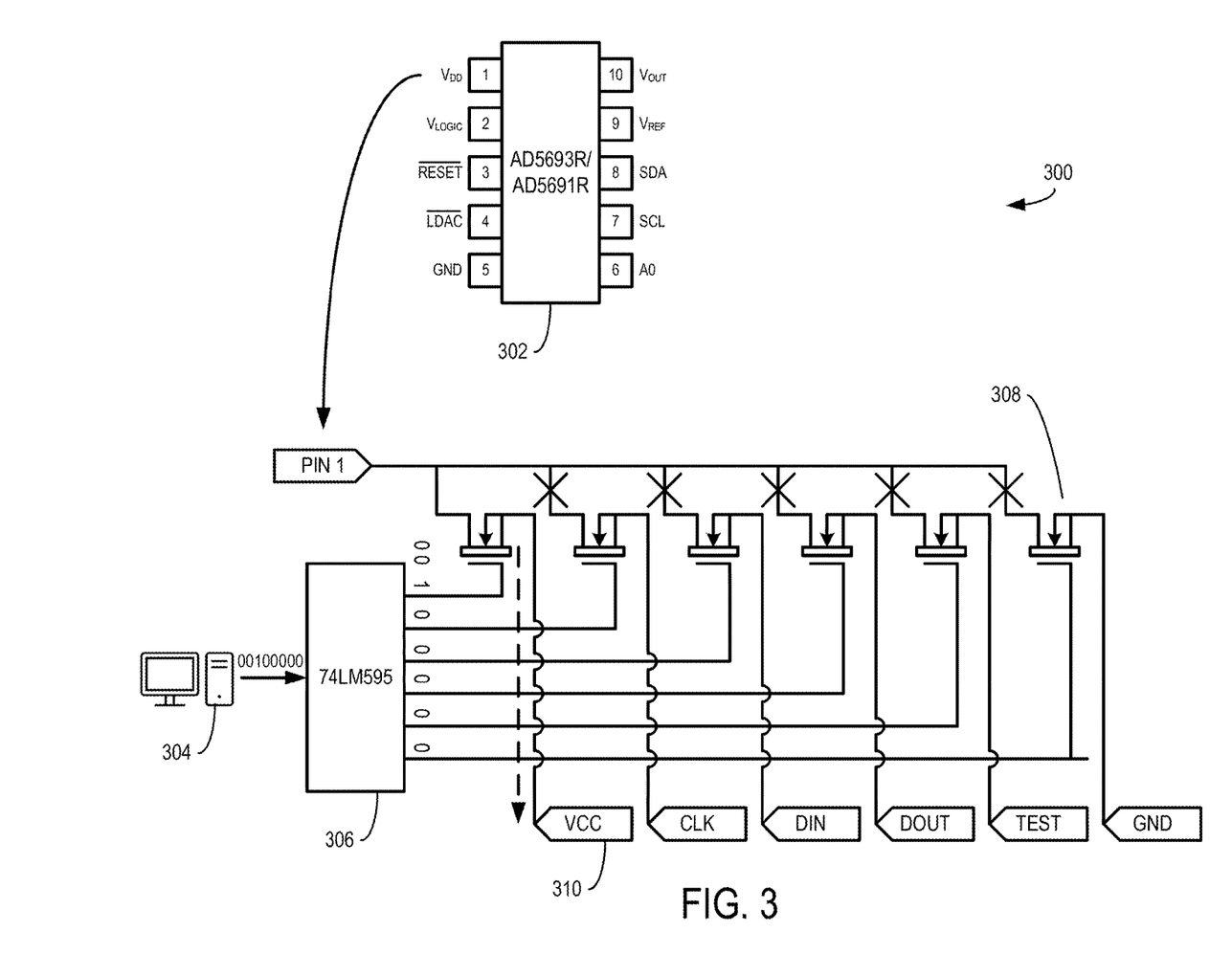
FIG. 3 illustrates an example of a universal circuit configuration system for a 3 IC pin auto routing methodology in accordance with various aspects of the present disclosure.

FIG. 3 illustrates one example of a universal circuit configuration system 300 in more detail, for a 3 IC pin auto routing methodology. The system 300 may be the same as or similar to the system 100 illustrated in FIG. 1 and may implement the control signal flowchart 200 illustrated in FIG. 2. FIG. 3 illustrates an example of a chip under test 302 having an AD5693R or AD5691R architecture. The system 300 includes a control device 304 (which may be the same as, similar to, or configured to implement the MicroPython framework 202 of FIG. 2), a status shift register 306 (which may be the same as or similar to the status shift register 208 of FIG. 2), a plurality of MOSFETs 308 (each of which may be the same as or similar to the high-speed MOSFET 210 of FIG. 2), and a series of outputs 310. Based on the information received (e.g., the chip model, data sheet, and/or pin setting information), the status shift register 306 outputs a series of control signals to gate electrodes of the MOSFETs 308. The control signals cause the MOSFETs 308 to selectively conduct, thereby routing signals from pins of the chip under test 302 to corresponding outputs 310.

For the chip under test 302 of FIG. 3, pin 1 ($V_{DD}$) is the power supply input, which may receive a power supply voltage between 2.7 volts (V) and 5.5 V. The power supply input may be decoupled from ground. Pin 2 ($V_{LOGIC}$) is a digital power supply, which may receive voltages between 1.62 V and 5.5 V. The digital power supply may also be decoupled from ground. Pin 3 ($\overline{RESET}$) is a hardware reset pin, the input of which is low-level sensitive. Thus, if the input is low, the device is reset and external pins are ignored. The input and digital-to-analog converter (DAC) registers are loaded with zero code value and the control register loaded with default values. This pin may be tied to pin 2 if not used. If pin 3 is forced low at power-up, the power-on reset (POR) circuit may not initialize the device correctly until pin 3 is released. Pin 4 ($\overline{LDAC}$) is the load DAC. This pin transfers the content of the input register to the DAC register. It may be operated in either a synchronous mode or an asynchronous mode. Pin 4 may be tied permanently low, and the DAC updates when new data is written to the input register. Pin 5 (GND) is the ground reference voltage. Pin 6 (A0) is a programmable address for multiple package decoding. Pin 6 may be updated on-the-fly. Pin 7 (SCL) is the serial clock line. Pin 8 (SDA) is the serial data I/O. Pin 9 ($V_{REF}$) is the reference I/O. In the device illustrated in FIG. 3, this a reference output pin by default, and may use a 10 nanofarad (nF) decoupling capacitor for the internal reference. Finally, pin 10 ($V_{OUT}$) is the analog output voltage from the DAC. The output amplifier has rail-to-rail operation.

As illustrated in FIG. 3, the control device 304 causes the status shift register 306 to output logical "1" for a single MOSFET 308 (e.g., the MOSFET 308 predicted by the system 300 to correspond to the input pin) and to output logical "0" for all other MOSFETs 308. Thus, the system 300 maps each input pin of the chip under test 302 to a corresponding output 310. In the particular example of FIG. 3, pin 1, labeled by the manufacturer of the chip under test 302 as $V_{DD}$, is routed to the output 310 corresponding to the label VCC. Thus, the system 300 standardizes the outputs from the chip under test 302 independent of chip architecture or labeling scheme.

Figure 4:
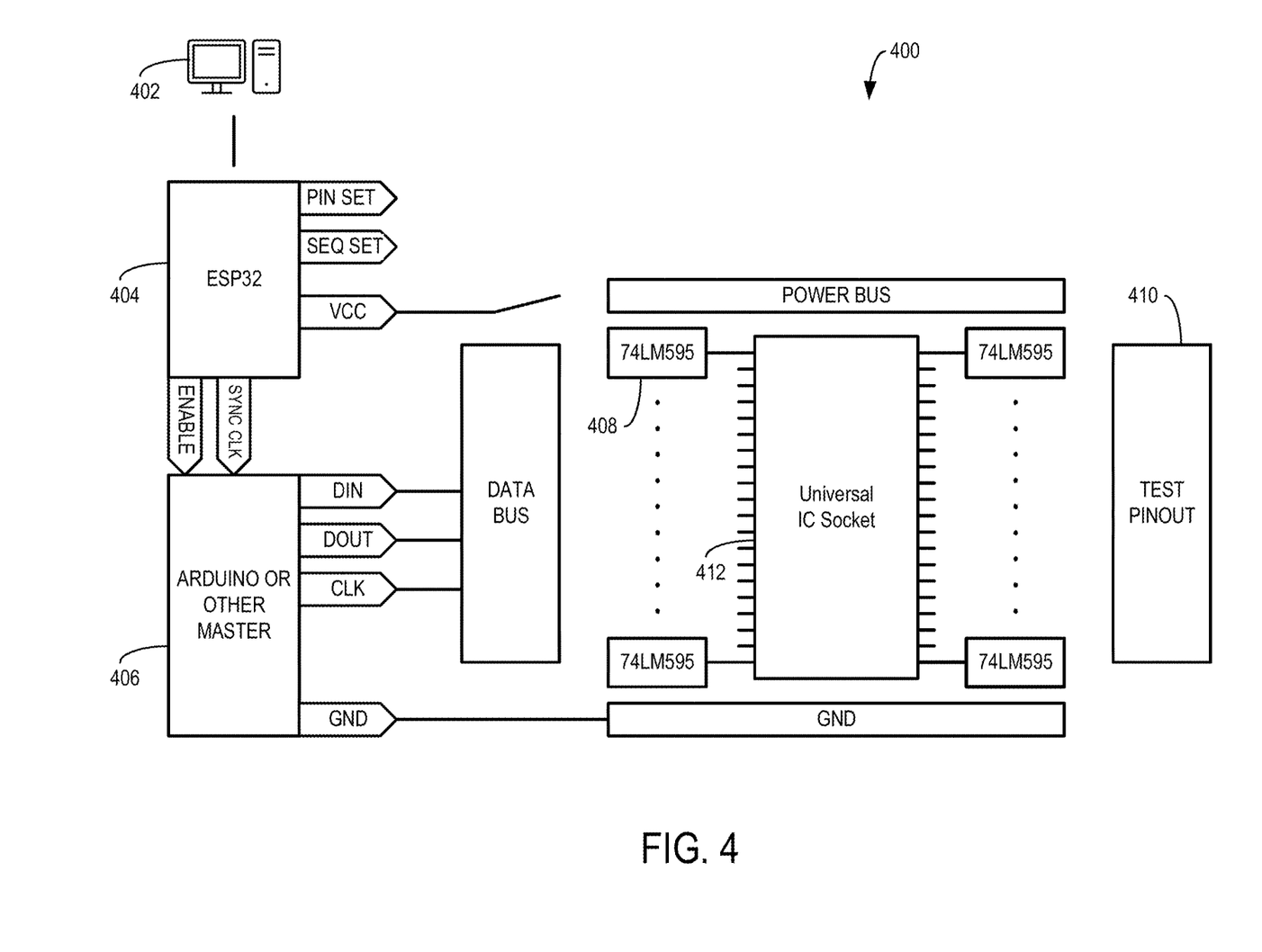
FIG. 4 illustrates an example of a universal circuit configuration system for a 4 IC pin auto routing realization in accordance with various aspects of the present disclosure.

FIG. 4 illustrates one example of a universal circuit configuration system 400 in more detail, for a 4 IC pin auto routing realization. The system 400 may be the same as or similar to the system 100 illustrated in FIG. 1 and may implement the control signal flowchart 200 illustrated in FIG. 2. The system 400 includes a control device 402 (which may be the same as, similar to, or configured to implement the MicroPython framework 202 of FIG. 2), an ESP32 SOC module 404 (which may be the same as or similar to the SOC module 204 of FIG. 2), an Arduino or other master device 406 (which may be the same as or similar to the DSP communication module 206 of FIG. 2), a plurality of status shift registers 408 (individual ones of which may be the same as or similar to the status shift register 208 of FIG. 2), a test pinout 410 (which may be the same as or similar to the high-speed MOSFET 210 of FIG. 2), and a universal IC socket 412 (which may be the same as or similar to the universal IC socket 212 of FIG. 2). While only four of the status shift registers 408 are shown in FIG. 4 for ease of illustration, in practice the number of status shift registers 408 may be equal to the number of pins of the universal IC socket 412 (e.g., 40). Power may be provided via a power regulator, which may in one implementation be an LTC3569 triple output step-down power regulator manufactured by Linear Technologies. Timing of may be implemented according to one or more clocks, such as a set of 12-megahertz (MHz) crystal oscillators.

Figure 5:
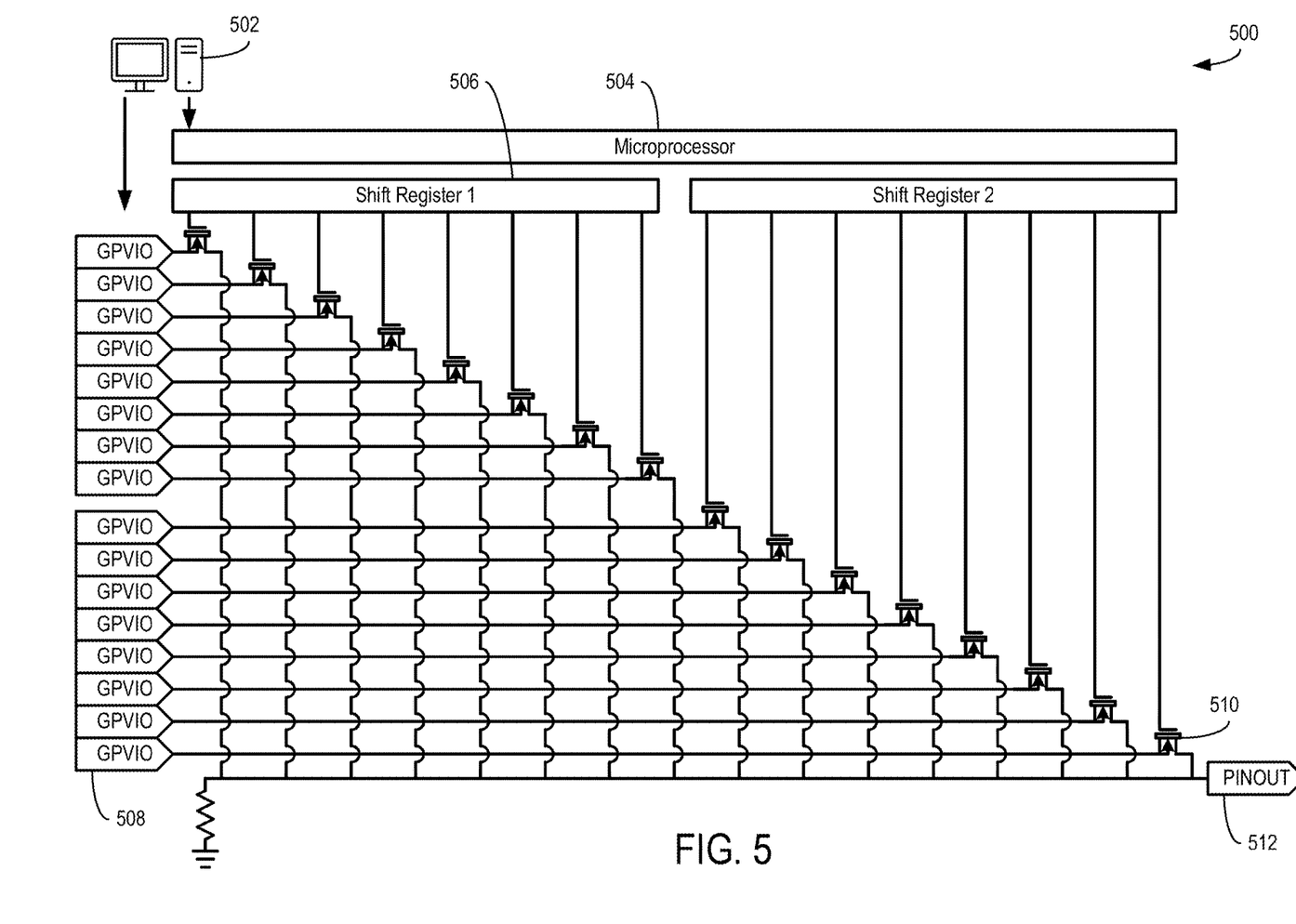
FIG. 5 illustrates an example of a universal circuit configuration system for a 5 IC pinout resources configuration in accordance with various aspects of the present disclosure.

FIG. 5 illustrates another example of a universal circuit configuration system 500 in more detail, for a 5 IC auto routing realization. The system 500 may be the same as or similar to the system 100 illustrated in FIG. 1 and may implement the control signal flowchart 200 illustrated in FIG. 2. In some implementations, the system 500 and the system 400 may be usable together. The system 500 includes a control device 502 (which may be the same as, similar to, or configured to implement the MicroPython framework 202 of FIG. 2). The control device 502 is operatively connected to a microprocessor, which in turn is connected to a pair of 8-bit shift registers 506 (respective ones of which may be the same as or similar to the status shift register 208 of FIG. 2). The control device is also operatively connected to a series of general purpose voltage source/input/output (GPVIO) interfaces 508. In some implementations, the GPVIO interfaces 508 are correspond to the output of a universal IC socket (which may be the same as or similar to the universal IC socket 212 of FIG. 2).

The shift registers 506 control the operation of a plurality of MOSFETs 510 (which may be the same as or similar to the high-speed MOSFETS 210 of FIG. 2), for example by controlling a respective gate voltage of the MOSFETs 510. Each GPVIO interface 508 output is connected to a current terminal of a different MOSFET 510. In response to control of the gate voltage by the shift registers 506, each MOSFET 510 selectively permits the output of the corresponding GPVIO interface 508 to pass from one current terminal to the other, thereby to be output via a pinout 512. The pinout 512 may be connected to a chip tester.

Figure 6A:
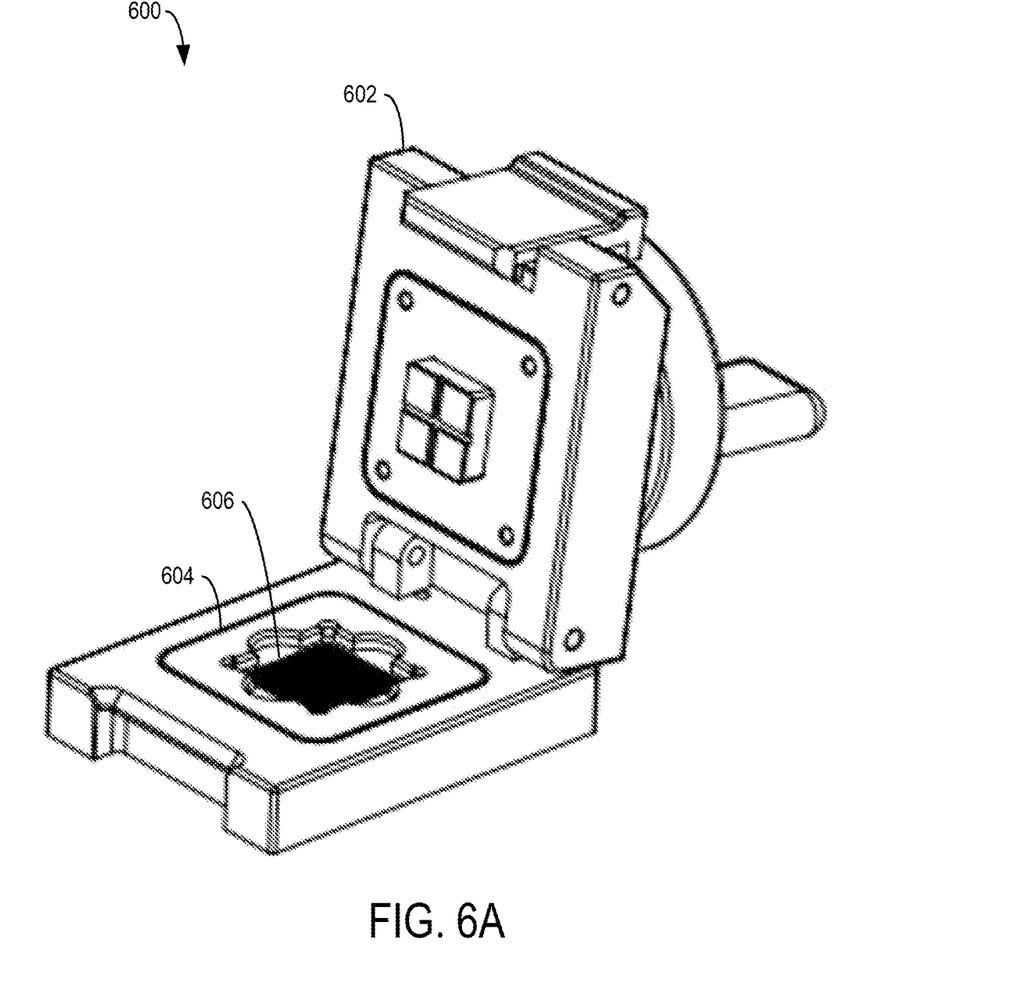
FIG. 6A illustrates an example of a universal IC socket in accordance with various aspects of the present disclosure.
Figure 6B:
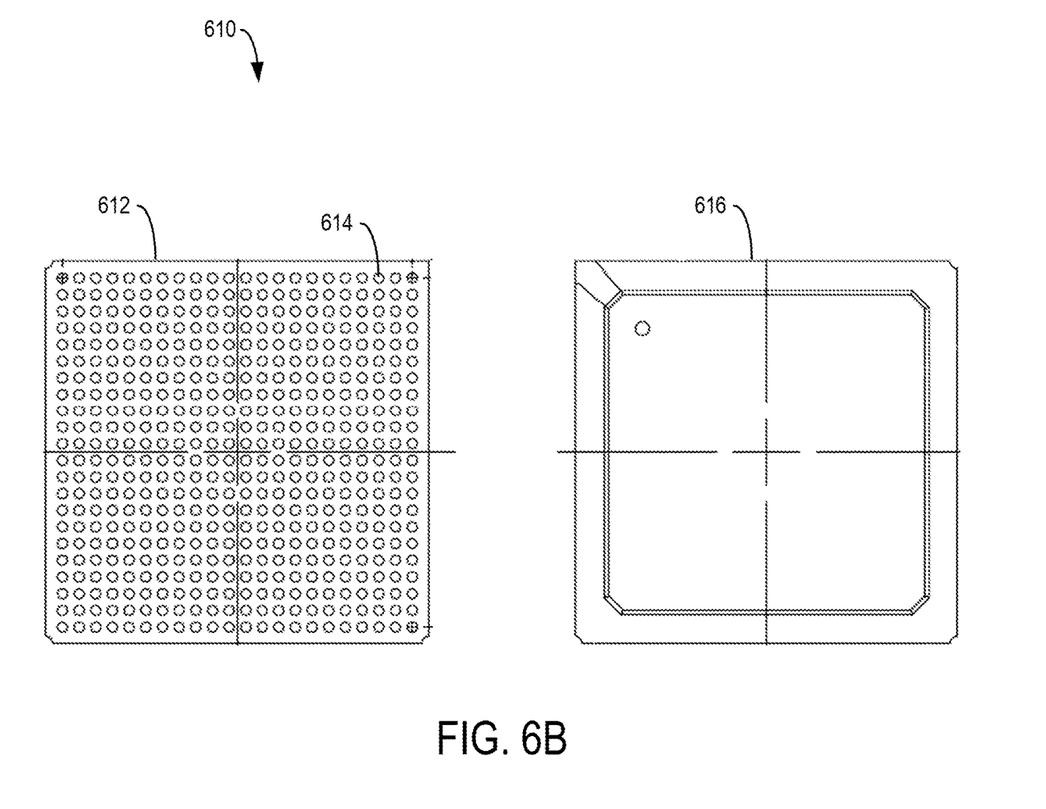
FIG. 6B illustrates an example of a chip under test in accordance with various aspects of the present disclosure.

FIG. 6A illustrates an example of a universal IC socket 600 in accordance with the present disclosure. The socket 600 may be the same as or similar to the universal IC socket 212 of FIG. 2. The socket 600 includes a socket housing 602 connected to a limit box 604, for example via a hinge which permits movement across a 100° angular range. The socket 600 also includes a latch to secure the socket housing 602 to the limit box 604 in a closed state. The upper surface of the limit box 604 may include a plurality of conductive pads 606 disposed in a recess. The conductive pads 606 are formed of a conductive material, such as copper, gold, nickel, or alloys or combinations thereof (e.g., gold-plated nickel). Any number of conductive pads 606 may be present, and may be arranged in any configuration. In one example, the first surface 612 includes 484 conductive pads 606, each having a diameter of approximately 0.65 mm and arranged in a square array (e.g., 22×22) at a pitch of approximately 1 mm. The plurality of conductive pads 606 may be formed directly in the recess of the limit box 604, or may be formed on a printed circuit board (PCB) that is contained within or mounted to the limit box (i.e., and exposed via the recess). The recess of the limit box 604 is dimensioned to receive a chip under test 610 (see FIG. 6B) and hold it securely in place while testing is performed. In one example, the recess is substantially square with a length/width of approximately 23.16 millimeters (mm) so as to accommodate chips approximately 23 mm across. If a smaller chip is tested, the limit box 604 may be equipped with a bracket to hold the chip in place.

The chip under test 610 includes a first surface 612 including a plurality of conductive pads 614, and a second surface 616 opposite the first surface 612. Any number of conductive pads 614 may be present, and may be arranged in any configuration. In one example, the first surface 612 includes 484 conductive pads 614, each having a diameter of approximately 0.60 mm and arranged in a square array (e.g., 22×22) at a pitch of approximately 1 mm. When the chip under test 610 is placed in the recess of the limit box 604 and the socket housing 602 is closed, the conductive pads 614 of the chip under test 610 are placed in contact with corresponding conductive pads 606 in the limit box 604. The socket 600 may include further components, such as a system board configured to implement and/or interface with any of the components or functions described above with regard to FIGS. 1-5, thus routing pins of the chip under test 610 to a set of output pins on the socket 600. These output pins may be connected to a chip tester.

Figure 7:
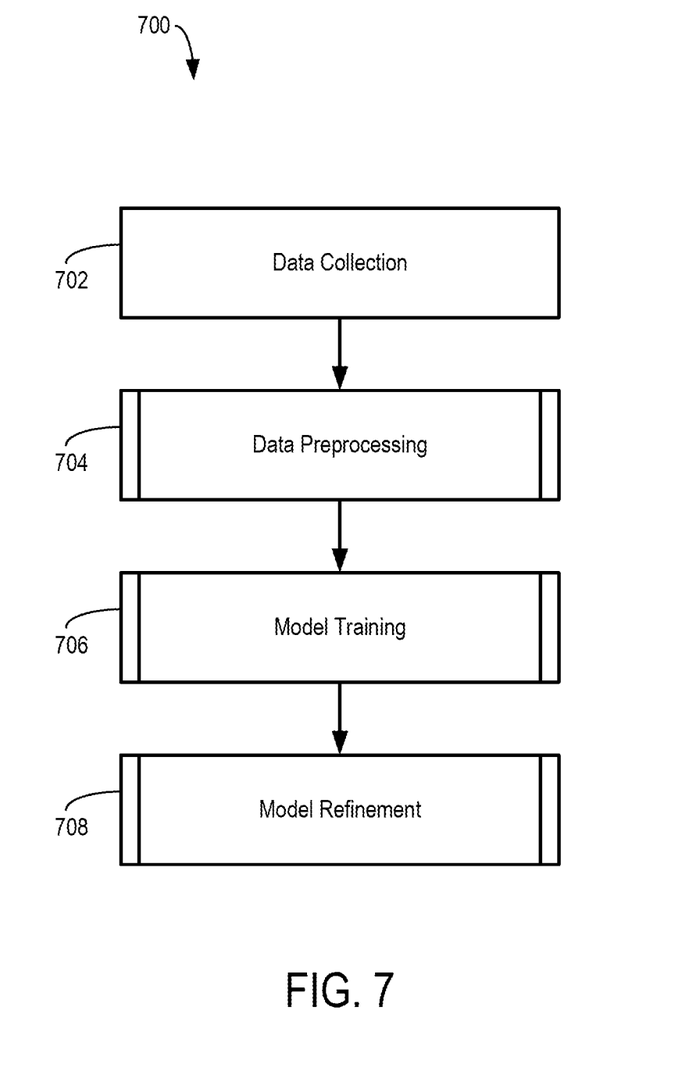
FIG. 7 illustrates an example of a method of training a model for use with a universal circuit configuration system in accordance with various aspects of the present disclosure.
Figure 8A:
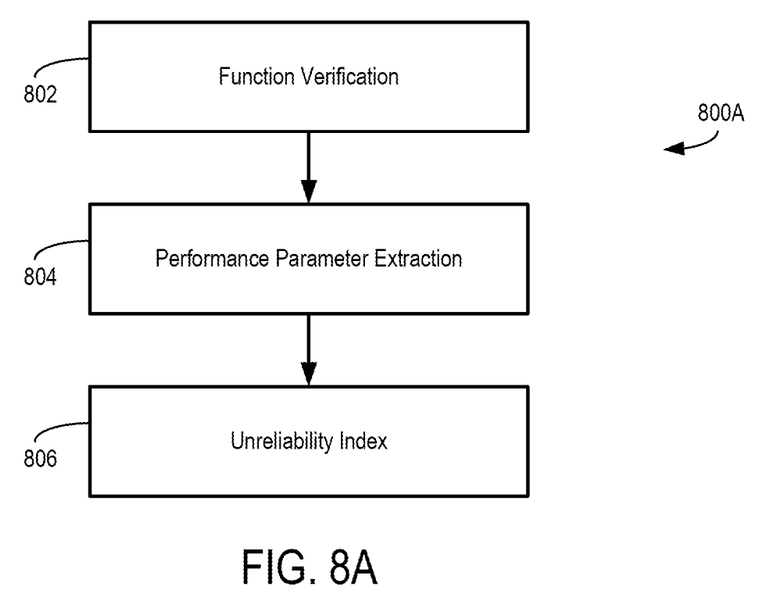
FIGS. 8A-8C respectively illustrate examples of sub-operations of the method of FIG. 7.
Figure 8B:
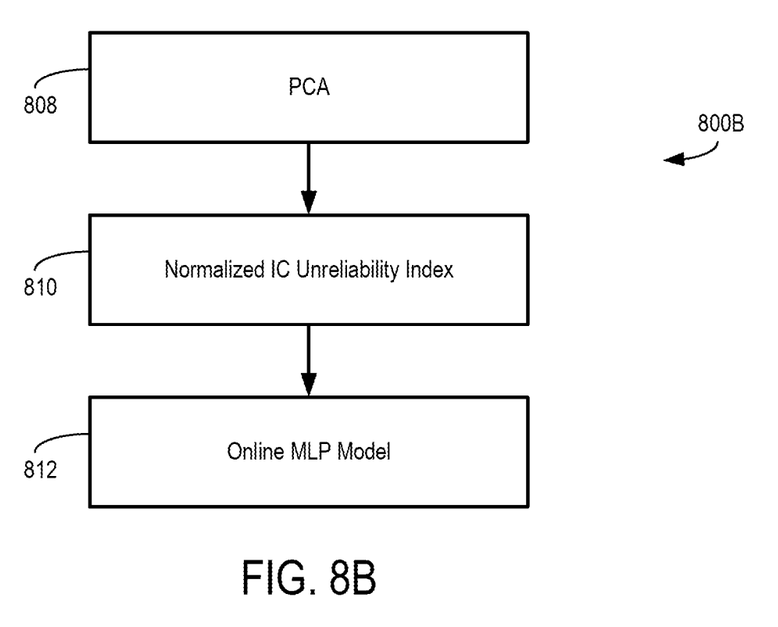
Figure 8C:
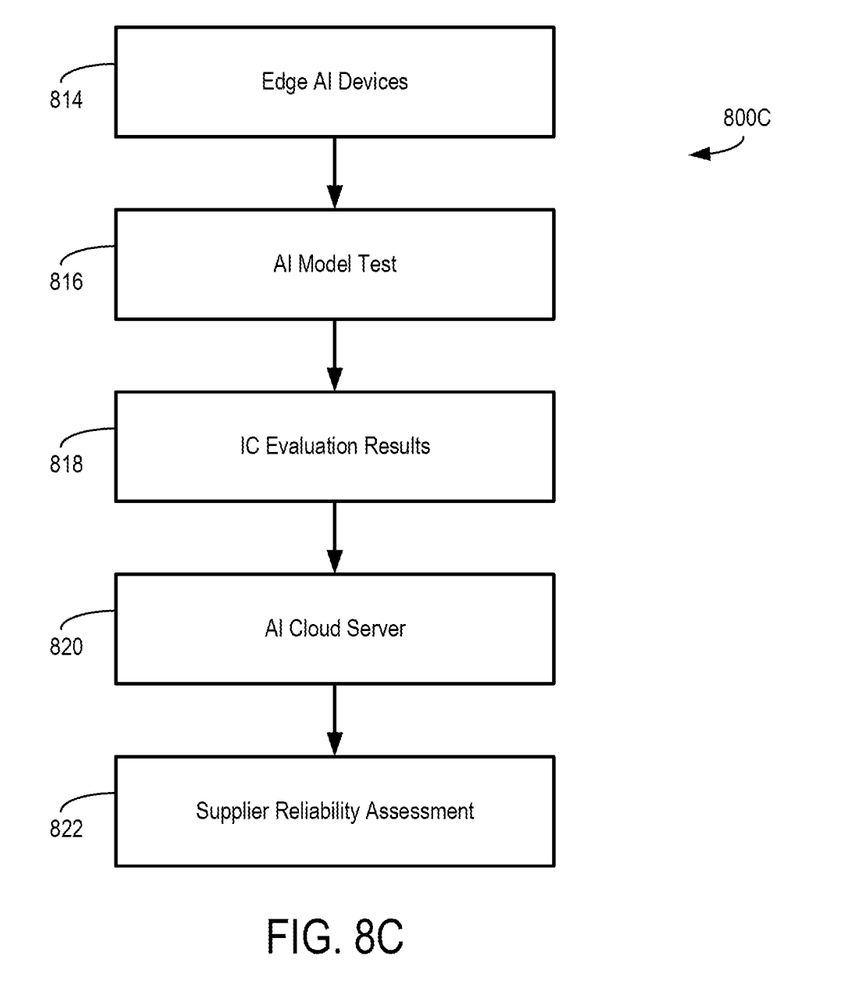

FIG. 7 illustrates an example of a method 700 of training a model, such as a machine learning (ML) model, to identify various aspects of a chip under test (e.g., a package pin configuration) and to connect pins of the chip under test to a tester device. FIGS. 8A-8C respectively illustrate examples of sub-methods 800A-800C, which may correspond to series of sub-operations which make up various operations of the method 700.

The method 700 begins with an operation 702 of data collection regarding a chip under test. Operation 702 may include obtaining information based on the chip model or part number, information from a data sheet, information from a previous ML model and/or a previous test, or combinations thereof. Once collected, the data is subjected to a data preprocessing operation 704, which is illustrated in more detail as the sub-method 800A of FIG. 8A. As shown in FIG. 8A, operation 704 may include an operation 802 of verifying one or more functions indicated by the data collected in operation 702, an operation 804 of extracting performance parameters based on the information obtained in operation 702 and/or verified in operation 802. Based on the performance parameters, at operation 806 an unreliability index may be generated.

Returning to FIG. 7, after operation 704 a ML model may be trained at operation 706. An example of operation 706 is illustrated as sub-method 800B of FIG. 8B. Sub-method 800B begins with a principal component analysis (PCA) at operation 808 to facilitate analysis (e.g., reduce the dimensionality) of the data. At operation 810, a normalized IC unreliability index may be generated. This may be generated by applying the results of operation 808 to the unreliability index generated at operation 806 (see FIG. 8A). These parameters and indices may be provided to an online ML model at operation 812, thereby training the model. The online ML model may be any ML model, and may be cloud-based or otherwise located remote from the system implementing the methods 700 and 800A-800B.

Operations 702-706 may provide for initial training of the ML model. At operation 708, the ML model may be refined, for example to improve the accuracy of predictions generated by the ML model. Sub-method 800C of FIG. 8C shows one example of sub-operations which may implement operation 708. At operation 814, information may be provided to one or more edge artificial intelligence (AI) devices (e.g., an AI device that is local to or in the vicinity of the system implementing the methods 700 and 800A-800B). The information in operation 814 may be the same as or similar to (e.g., a subset of) the data collected in operation 702. At operation 816, an AI model test may be performed. The AI model test may be performed by the edge AI device. The results of the AI model test may be used to further refine the online ML model implemented at operation 812 of FIG. 8B. Additionally or alternatively, the AI model test may generate IC evaluation results at operation 818, which may in turn be provided to an AI cloud server at operation 820. The AI cloud server may be configured to perform a supplier reliability assessment at operation 822. The results of the supplier reliability assessment may be provided to the online ML model implemented at operation 812 of FIG. 8B.

Figure 9:
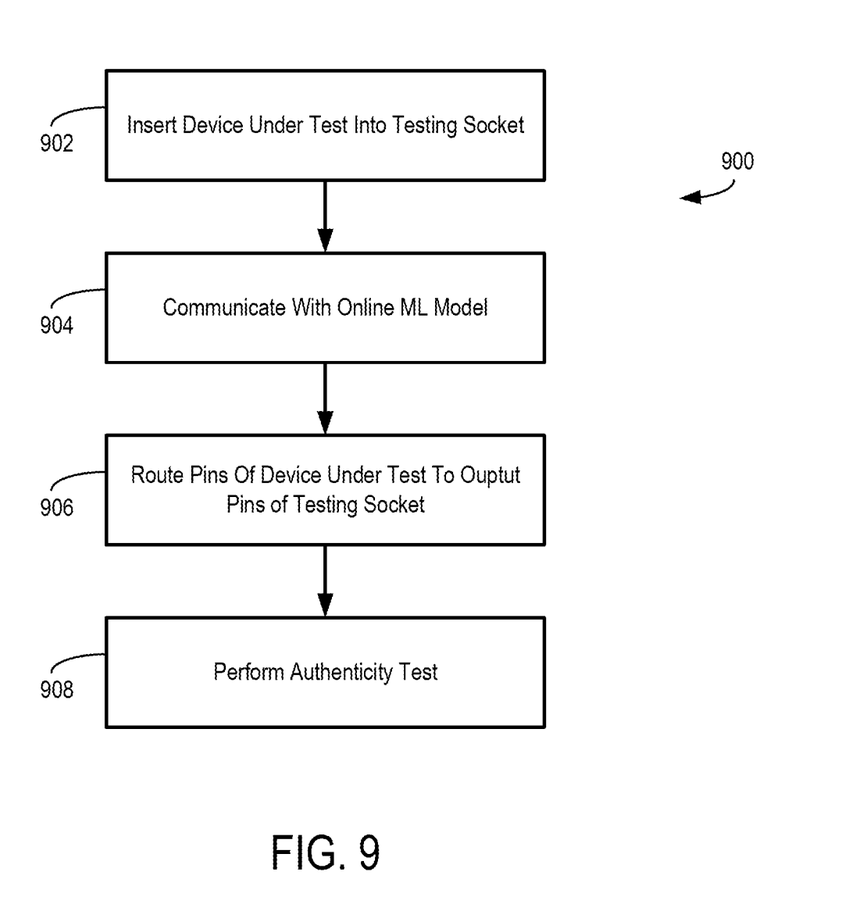
FIG. 9 illustrates an example of a testing method in accordance with various aspects of the present disclosure.

FIG. 9 illustrates an example of a universal circuit testing method 900. The method 900 may be used to test the authenticity of a device under test (DUT), which may be a chip, a circuit, or another electronic device. The method 900 begins at operation 902 with the insertion of the DUT into a testing socket. The testing socket may be the same as or similar to the universal circuit configuration systems described above with regard to FIGS. 1-6. In one particular example, operation 902 may include inserting the chip under test 610 into the socket 600 (see FIG. 6), such that the conductive pads 614 of the chip under test 610 come into contact with the plurality of conductive pads 606 of the socket 600.

With the DUT inserted into the testing socket, at operation 904 the system implementing the method 900 communicates with an online ML model. In one example, operation 904 includes providing information on the DUT (e.g., chip model, data sheet information, pin setting information, combinations thereof, etc.) to the online ML model (e.g., to a server operating the ML model). The online ML model may be an ML model that has been trained using the operations described above with regard to FIGS. 7-8C. Operation 904 may further include receiving response data output by the ML model (e.g., from the server operating the ML model), the response data including a pin configuration information and/or a timing configuration information regarding the DUT. Based on an output of the ML model, at operation 906 the testing socket may route pins of the DUT to output pins of the testing socket. These output pins may be connected to a chip testing device, which at operation 908 performs an authenticity test for the DUT. The authenticity test may include data sheet confirmation, a maximum data throughput test, and/or a data interference test.

In accordance with the above systems and methods, a universal chip test socket is provided, which may be backward compatible with chips having different input designs. Moreover, the ML model may generate and/or implement one-to-one online pin definitions for the DUT. The testing system may use a wireless communication technology (e.g., Wi-Fi) to connect to an online database which may include the ML model, thereby allowing operators to remotely set pins and perform online debugging. Programmable power-up and pin definitions may assist different chip analyses to be adjusted in real time, without the need to build a separate breadboard circuit.

Any of the functionality or circuits described herein may take the form of, or incorporate, or be incorporated into, a register, an advanced memory buffer (AMB), a buffer, or the like, and may comply with Joint Electron Device Engineering Council (JEDEC) standards, and may have forwarding, storing, and/or buffering capabilities.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the scope of the present disclosure defined in the following claims, the scope of which are to be accorded the broadest interpretation so as to encompass modifications and equivalent structures.

What is claimed is:

1. A universal circuit configuration system comprising:
   a socket configured to receive a device under test (DUT), wherein the server device is external to the universal circuit configuration system, wherein the socket includes a plurality of input pins and a plurality of output pins, and wherein the DUT includes a plurality of device pins;
   a wireless communication device of the universal circuit configuration system configured to:
     wirelessly transmit information on the DUT to a server device operating a machine learning (ML) model, and
     wirelessly receive response data generated by the ML model from the server device, the response data including at least one of a pin configuration information of the DUT or a timing configuration information of the DUT; and
   a switch array comprising a metal-oxide-semiconductor field-effect transistor (MOSFET) and operatively connected between the plurality of input pins and the plurality of output pins and configured to route respective ones of the plurality of device pins to corresponding ones of the plurality of output pins based on the response data.

2. The system of claim 1, wherein, in a state of the DUT being received in the socket, respective ones of the plurality of device pins are operatively connected to corresponding ones of the plurality of input pins.

3. The system of claim 1, wherein the information on the DUT includes at least one of a chip model information, a data sheet information, or a pin configuration information.

4. The system of claim 1, wherein the ML model is a trained ML model that has been trained on a set of reference DUTs.

5. The system of claim 1, further comprising:
   a device tester operatively connected to the plurality of output pins, wherein the device tester is configured to determine an authenticity of the DUT.

6. A universal method of device testing, the method comprising:
   inserting a device under test (DUT) into a socket, wherein the server device is external to a universal circuit configuration system comprising the socket, wherein the socket includes a plurality of input pins and a plurality of output pins and wherein the DUT includes a plurality of device pins, such that respective ones of the plurality of device pins are operatively connected to corresponding ones of the plurality of input pins;
   communicating, via a wireless communication device of the universal circuit configuration system, with a server device operating an ML model, including:
     wirelessly transmitting information on the DUT to the server device, and
     wirelessly receiving response data generated by the ML model from the server device, the response data including at least one of a pin configuration information of the DUT or a timing configuration information of the DUT; and
   routing, via a switch array of the universal circuit configuration system operatively connected between the plurality of input pins and the plurality of output pins, respective ones of the plurality of device pins to corresponding ones of the plurality of output pins based on the response data, wherein the switch array comprises a metal-oxide-semiconductor field-effect transistor (MOSFET).

7. The method of claim 6, wherein the information on the DUT includes at least one of a chip model information, a data sheet information, or a pin configuration information.

8. The method of claim 6, wherein the ML model is a trained ML model that has been trained on a set of reference DUTs.

9. The method of claim 6, wherein routing the respective ones of the plurality of device pins to the corresponding ones of the plurality of output pins includes controlling a plurality of switches in the switch array of the socket.

10. The method of claim 6, further comprising:
    connecting a device tester to the plurality of output pins such that the device tester is communicatively coupled to the plurality of device pins.

11. The method of claim 10, further comprising:
    with the device tester, performing an authenticity test on the DUT.

12. The method of claim 11, wherein the authenticity test includes at least one of a data sheet confirmation test, a maximum data throughput test, or a data interference test.

13. A non-transitory computer-readable medium storing instructions that, when executed by a processor of a universal circuit configuration system having a device under test (DUT) inserted in a socket of the universal circuit configuration system, wherein the server device is external to the universal circuit configuration system, cause the universal circuit configuration system to:
    wirelessly transmit, via a wireless communication device of the universal circuit configuration system, information on the DUT to a server device operating an ML model;
    wirelessly receive, via the wireless communication device of the universal circuit configuration system, response data generated by the ML model from the server device, the response data including at least one of a pin configuration of the DUT or a timing configuration of the DUT; and
    route, via a switch array of the universal circuit configuration system operatively connected between a plurality of input pins of the socket and a plurality of output pins of the socket, respective ones of a plurality of device pins of the DUT, that are in contact with corresponding ones of the plurality of input pins of the socket, to corresponding ones of the plurality of output pins of the socket based on the response data, wherein the switch array comprises a metal-oxide-semiconductor field-effect transistor (MOSFET).

14. The non-transitory computer-readable medium of claim 13, wherein the information on the DUT includes at least one of a chip model information, a data sheet information, or a pin configuration information.

15. The non-transitory computer-readable medium of claim 13, wherein the ML model is a trained ML model that has been trained on a set of reference DUTs.

16. The non-transitory computer-readable medium of claim 13, wherein the instructions are further configured to cause the universal circuit configuration system to:
  place a device tester in communication with the plurality of output pins of the socket.

17. The non-transitory computer-readable medium of claim 16, wherein the instructions are further configured to cause the universal circuit configuration system to:
  perform an authenticity test on the DUT.

18. The non-transitory computer-readable medium of claim 17, wherein the authenticity test includes at least one of a data sheet confirmation test, a maximum data throughput test, or a data interference test.

* * * * *